United States Patent [19]

Bonafe

[11] Patent Number: 4,967,363
[45] Date of Patent: Oct. 30, 1990

[54] SPEED REFERENCE SYSTEM FOR PILOTING AN AIRCRAFT

[75] Inventor: Jean L. Bonafe, Toulouse, France

[73] Assignee: Aerospatiale Societe Nationale Industrielle, Paris, France

[21] Appl. No.: 287,288

[22] Filed: Dec. 21, 1988

[30] Foreign Application Priority Data

Dec. 22, 1987 [FR] France ............................. 87 17932

[51] Int. Cl.⁵ ............................................. G06F 15/50
[52] U.S. Cl. ................................... 364/427; 244/181; 73/178 T
[58] Field of Search ............... 364/427, 428, 433, 434; 318/564; 244/180, 181; 73/178 T

[56] References Cited

U.S. PATENT DOCUMENTS

| | | | |
|---|---|---|---|
| 3,863,056 | 1/1975 | Klein | 318/564 |
| 4,092,578 | 5/1978 | Fabian | 318/564 |
| 4,130,241 | 12/1978 | Meredith et al. | 318/564 |
| 4,162,438 | 7/1979 | Osder | 318/564 |
| 4,764,872 | 8/1988 | Miller | 364/433 |
| 4,841,448 | 6/1989 | Ford | 364/433 |

FOREIGN PATENT DOCUMENTS

| | | |
|---|---|---|
| 0235964 | 2/1987 | European Pat. Off. . |
| 0229197 | 5/1987 | European Pat. Off. . |
| 0258498 | 3/1988 | European Pat. Off. . |
| 2316647 | 1/1977 | France . |

*Primary Examiner*—Thomas G. Black
*Attorney, Agent, or Firm*—Fisher, Christen & Sabol

[57] ABSTRACT

This invention relates to a speed reference system for piloting an aircraft, delivering information on piloting in pitch, particularly during the phases of take-off and of go-round, wherein this system comprises a first voter receiving a first difference between a displayed speed and the real aerodynamic speed, a second difference between the real pitch attitude and a reference attitude and a third difference between the real vertical speed and a vertical speed limit; a second voter receiving the output signal of said first voter and said third difference and delivering the smaller of these two signals; and a third voter receiving the output signal of said second voter and a fourth difference between an aerodynamic speed limit and said real aerodynamic speed, and delivering the greater of these two signals.

11 Claims, 6 Drawing Sheets

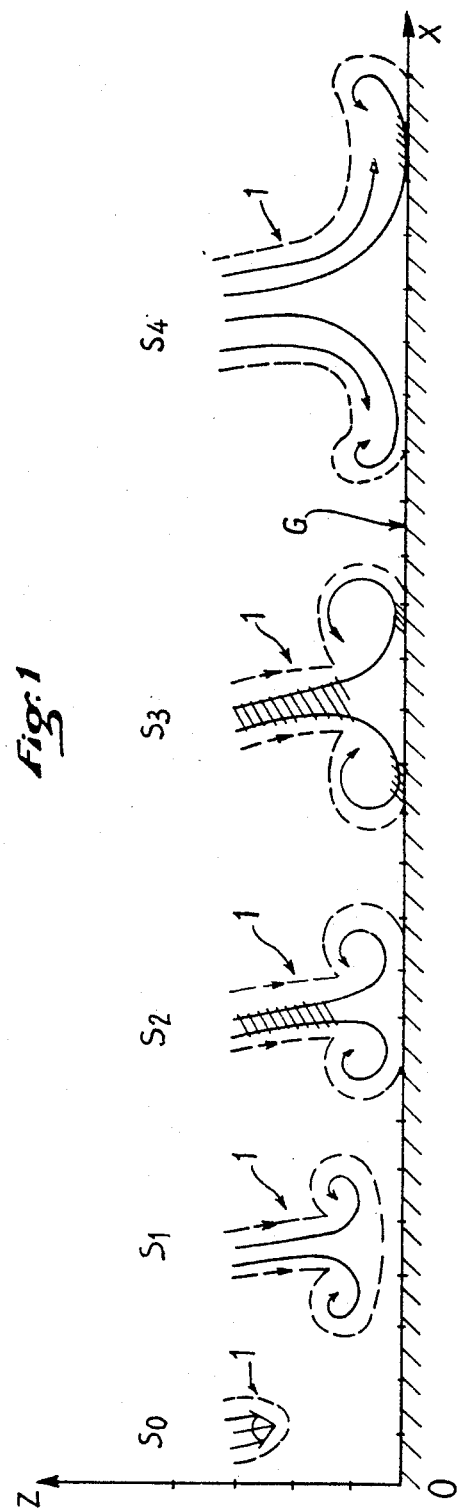

SPEED REFERENCE SYSTEM FOR PILOTING AN AIRCRAFT

FIELD OF THE INVENTION present invention relates to speed reference systems for the piloting of aircraft, such systems sometimes being referred to as SRS systems.

BACKGROUND OF THE INVENTION

It is known that aircraft, and in particular jumbo jet civil aircraft, are equipped with automatic flight controls comprising a flight control computer (FCC) which groups the automatic pilot and the flight director. These automatic flight controls comprise, inter alia, a speed reference system, particularly active in take-off and go-around phase and delivering piloting information to the flight director and/or to the automatic pilot.

In addition, it is known that the flight director comprises an attitude director indicator controlled by said speed reference system and whose purpose is to display the attitudes of the aircraft; to that end, said attitude director indicator comprises a model and a mobile sphere, the position of said model with respect to said mobile sphere materializing the real attitude information of the aircraft, whilst the information of the flight director, furnished by the FCC computer, is displayed by horizontal and vertical bars, including a pitch bar, which indicates the tendency of the longitudinal control of the aircraft. The position of this pitch bar with respect to the model indicates to the pilot either an order to dive or an order to pull up, or, if said pitch bar is superposed on said model, that the aircraft lies in the desired configuration. In this way, the action of the pilot (or of the automatic pilot) is to act on the elevator, in order to superpose the pitch bar on the model.

It will be readily appreciated that, in the event of failure of an engine, such a speed reference system considerably simplifies the pilot's work which in that case consists in acting on the elevator to maintain the pitch bar and the model of the attitude director indicator in superposition.

Modern aircraft are thus equipped with such a speed reference system. For example, the twin-engine aircraft AIRBUS A-310 and A-300-600 comprise a speed reference system essentially constituted by a voter (i.e. a comparator with three inputs, at the output of which appears that of the three input signals whose amplitude is included between those of the other two), which receives at its inputs electrical signals respectively representative of a first difference between a desired speed displayed by the pilot and the real aerodynamic speed of the aircraft (corrected by the dynamic pressure), of a second difference between the real pitch attitude and a reference pitch attitude (for example selected to be equal to 18°), and of a third difference between the real baroinertial vertical speed and a vertical speed limit (for example determined as being the minimum climbing speed with one engine at the gradient of 2.4%).

A vote between these three differences is made at each step of calculation of the FCC flight control computer.

As will be seen hereinafter in greater detail, during a vote:

(a) if the flight conditions upon take-off are normal, i.e. if the thrust/mass ratio concerning the aircraft is high, with the result that the aircraft continuously increases its kinetic energy and its potential energy, the first difference is negative, whilst the third is positive, with the result that the second difference is close to zero. The aircraft is then controlled to maintain an attitude equal to the reference attitude, with an increasing speed greater than the desired speed displayed by the pilot;

(b) if the thrust/mass ratio is low, either because the mass of the aircraft is high, or because an engine has broken down, the first difference becomes zero, whilst the second becomes negative and the third remains positive, with the result that it is this first difference which is transmitted by the voter. Under these conditions, the action of the pilot or of the automatic pilot is therefore to actuate the elevator of the aircraft to modify the attitude thereof in order to maintain the aerodynamic speed of the aircraft equal to the desired speed displayed by the pilot, increased by 10 kts, the attitude then being less than the reference attitude. In that case, the potential energy of the aircraft increases with constant kinetic energy.

A piloting system of the type which has been briefly described hereinabove is essentially designed to take into account the cases of failure of an engine. It goes without saying, since it uses real parameters of the aircraft (corrected aerodynamic speed, attitude and baroinertial vertical speed) which are sensitive to the aerodynamic environment thereof, that this piloting system also takes into account the disturbances of this environment. However, this latter consideration is accessory and may not be fine enough for a survival piloting in the event of the aircraft encountering a minitornado.

"Minitornado" is understood to mean the meteorological disturbances commonly designated in aeronautics by the English words "windshear", "downburst" or "microburst", and will be referred to hereinafter as "windshear".

Such windshear is essentially constituted by violent eddying, descending, air streams whose speed may be greater than 10 m/s and which present considerable horizontal and vertical speed components.

Although the probability of the aircraft encountering such windshear during take-off or landing is low, nonetheless there is a danger that the flight of an aircraft be strongly disturbed by windshear during these flight phases, during which its safety margin is relatively sensitive. It is estimated that, in the last twenty years, windshear has been responsible for about thirty accidents or failures upon take-off and landing, involving more than 600 deaths.

Consequently, it is an object of the present invention to improve the speed reference system described hereinabove in order to render it even more sensitive to the possible aerodynamic disturbances of the environment of the aircraft, in order in particular to define a strategy of survival piloting in the event of windshear.

SUMMARY OF THE INVENTION

To that end, according to the invention, the speed reference system for the piloting of an aircraft, adapted to deliver to the flight director and/or to the automatic pilot information on piloting in pitch, particularly during the phases of take-off and go-around, said system comprising a voter receiving at its inputs electrical signals respectively representative of a first difference between a desired speed displayed by the pilot and the real aerodynamic speed of the aircraft, of a second difference between the real pitch attitude of said aircraft and a reference pitch attitude, and of a third difference between the real baro-inertial vertical speed of said aircraft and a vertical speed limit, is noteworthy in that it comprises:

first voting means receiving at their inputs the output signal of said voter and the signal representative of said third difference and delivering at their output that of their two input signals which is the smaller; and second voting means receiving at their inputs the output signal of said first voting means and the signal representative of a fourth difference between an aerodynamic speed limit and said real aerodynamic speed, said second voting means delivering at their output that of their two input signals which is the greater.

As will be seen hereinafter:

in normal flight conditions, said first and second voting means do not intervene and the output of the speed reference system is that of said voter. Consequently, the aircraft will be controlled in the manner described hereinabove, concerning the known system equipping the AIRBUS A-310 and A-300-600 aircraft;

if a horizontal tail windshear and/or a downward vertical windshear appears, whose amplitude is such that the aerodynamic performances of the aircraft are not saturated, the system according to the invention allows a modulation of the climb gradient, so that the vertical speed with respect to the ground is maximum for a longitudinal speed maintained constant;

if a horizontal tail windshear and/or a downward vertical windshear appears which is sufficiently strong to saturate the aerodynamic performances of the aircraft:

in a first phase, the action of said first voting means takes precedence over the action of the voter and of said second voting means. The aircraft is piloted to maintain the vertical speed limit to the detriment of the longitudinal speed, with the result that it maintains its altitude. In this way, the potential energy of the aircraft with respect to the ground is maintained, losing kinetic energy;

in a second phase, if the atmospheric disturbance is very violent and of long duration, the action of said second voting means becomes preponderant in order to maintain a longitudinal speed limit greater than the stalling speed. In that case, the system makes it possible to maintain the kinetic energy to the detriment of the potential energy.

the operation of the system according to the present invention (and therefore the law of piloting that it defines) is independent of the thrust, mass or wind information. It is automatically adapted to the real and instantaneous performances of the aircraft.

Said first voting means advantageously present a structure identical to that of said voter, two of their inputs respectively receiving the output signal of said voter and said third difference, whilst, on their third input is applied a first biasing signal whose amplitude and/or sign are selected so that it is smaller than the smallest value likely to be taken by said output signal of the voter and by said third difference.

Reciprocally, it is advantageous if said second voting means present a structure identical to that of said voter, two of their inputs receiving respectively the output signal of said first voting means and said fourth difference, whilst, on their third input is applied a second biasing signal whose amplitude and/or sign are selected so that it is larger than the largest value likely to be taken by the output signal of said first voting means and by said fourth difference.

In order to avoid that, when the atmospheric disturbances disappear, the angle of attack of the aircraft take a value greater than the angle of stall, the system according to the invention advantageously comprises means for piloting a maximum attitude. If the demand is greater than this maximum attitude, the maximum instantaneous demand to pull up is a function of the initial attitude. This piloting means is effected by a limitation of the order of control as a function of the attitude of the aircraft. This action may be proportional to said attitude.

It is advantageous if, beyond a high threshold of real attitude of the aircraft to pull up, for example equal to 21° in absolute value, said limitation means deliver an order to dive. This order to dive then reduces the real attitude of the aircraft to pull up, in order to pilot the maximum attitude of 21° for example. In this way, beyond the maximum attitude, the order to dive cannot be less than the limit which is a function of the instantaneous attitude and, below the maximum attitude, the order to pull up cannot be greater than the limit which is a function of the instantaneous attitude.

Said attitude limitation means may also bring a limit (for example equal to 24°) higher than the value of the real attitude to dive.

Advantageously, in order to avoid the consequences of an error in display of speed by the pilot, the system according to the present invention comprises a second voter receiving at its inputs respectively a signal representative of said desired speed displayed by the pilot and signals representative respectively of a maximum reference value and of a minimum reference value for said desired displayed speed, the output of said second voter being connected to a subtractor receiving, furthermore, a signal representative of said real aerodynamic speed, the output of said subtractor being connected to the input of said voter receiving said first difference.

The present invention also relates to a system for piloting an aircraft in pitch during the phases of take-off and go-around, this piloting system comprising said speed reference system, of which the output is connected to an attitude director indicator and/or to an automatic pilot, in order to control the elevator of said aircraft in tune with the signal, possibly limited by said limitation means, delivered by said speed reference system.

Thus, thanks to the present invention, a piloting system is obtained, adapted to produce and conduct a self-adaptive strategy of survival thanks to the succession of three votes, made respectively by said voter and by said first and second voting means. In normal flight conditions, the vote of said voter is preponderant and all occurs as if said first and second voting means were transparent. These latter intervene selectively in the case of disturbances, to surmount the vote of said voter. Upon the disappearance of difficult atmospheric conditions, said first and second voting means become transparent again for the vote of said voter. Moreover, thanks to the action of said limitation means, the aircraft is protected against stalling at the end of said atmospheric disturbances.

It will be noted that the system according to the invention is, in addition, independent of any alarm system whose object is to draw the aircraft pilot's attention to the presence and/or the intensity of windshear.

BRIEF DESCRIPTION OF THE DRAWINGS

The invention will be more readily understood on reading the following description with reference to the accompanying drawings, in which:

FIG. 1. schematically shows a minitornado, or windshear, at different stages of its development in the vicinity of the ground.

In these Figures, identical references designate like elements.

DETAILED DESCRIPTION OF THE DRAWINGS

Figure 2A:
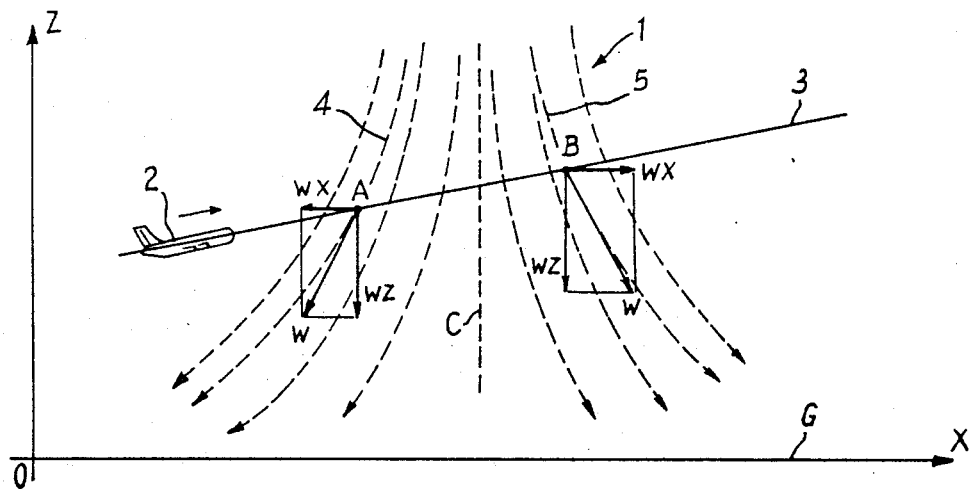
FIGS. 2a, 2b and 2c schematically illustrate the vertical and horizontal components of the speed of the air streams along the path of an aircraft traversing windshear.

Referring now to the drawings, FIG. 1 schematically shows, at five stages S0 to S4 of its development, a minitornado, or windshear, 1, which the speed reference system according to the invention is intended to take into account. In the diagram of FIG. 1, the axes OX and OZ are respectively horizontal and vertical, axis OX being at the level of ground G. To render the drawing clearer, the five stages of development of the windshear 1 have been shown spread along the horizontal axis OX, but it goes without saying that this arrangement is arbitrary and might be different. On the other hand, on axes OX and OY, lines equidistant by 1 km have been indicated, in order to give the scale of the phenomenon. Such a windshear 1 is constituted by descending currents which, after the initial stage of formation S0, diverge, eddying in the direction of the ground until they strike the latter. The hatched parts of these currents correspond to speeds greater than 10 m/s. If T2 designates the instant at which stage S2 occurs, when the windshear 1 reaches the ground, stages S0 and S1 may correspond respectively to instants T2−5 mn and T2−2 mn, whilst stages S3 and S4 may correspond respectively to instants T2+5 mn and T2+10 mn.

It is thus seen that, especially at stages S2 and S3, an aircraft passing through a windshear 1 risks losing speed and/or losing altitude.

Figure 2B:
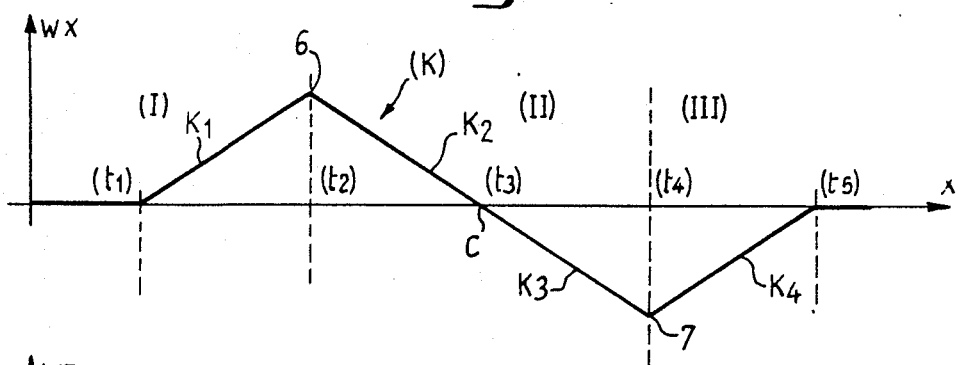
Figure 2C:
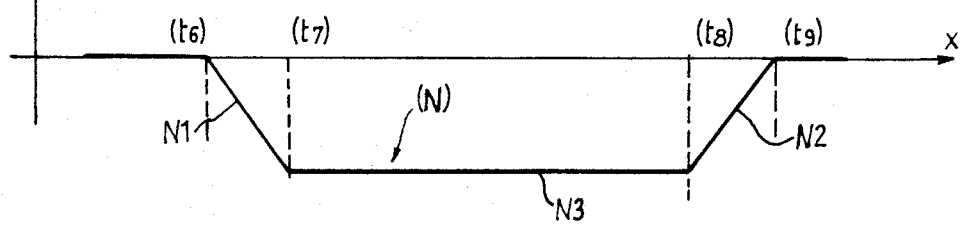

The diagrams of FIGS. 2a, 2b and 2c make it possible more readily to understand the effects of a minitornado 1 or windshear conditions on an aircraft 2 whose path 3 traverses the latter. In these Figures, it is assumed that the aircraft 2 moves from the left towards the right. At any point A or B of the windshear 1, the aircraft 2 is subjected by the latter to the action of air streams 4, 5 having a speed W, of which the direction is tangential to said air streams 4 or 5 passing through this point A or B, said speed W being oriented towards the ground G, but inclined outwardly of said minitornado 1 with respect to said ground. This inclination of the speed W towards the outside of the windshear 1 results from the divergent structure of the air streams thereof. Consequently, if the speed W is broken down into a horizontal component WX and a vertical component WZ, these components are constantly, and respectively, directed towards the outside of the windshear and towards the ground.

The result, therefore, is that, when the aircraft 2 moves from outside the windshear towards the center C thereof, the horizontal component WX behaves as a head wind, whilst, when the, aircraft 2 moves from the center C of the windshear towards the outside thereof, this horizontal component WX behaves as a tail wind. Of course, in the center C of the windshear, the component WX is cancelled to allow reversal of direction. Moreover, between the periphery of the windshear 1 and the center C thereof, the amplitude of the horizontal component WX is firstly increasing and then decreasing. Consequently, if the development of the component WX with respect to the aircraft 2 is shown extremely schematically, considering this component as positive or negative, respectively, when it corresponds to a head wind or to a tail wind, a curve is obtained such as the one designated by (K) in FIG. 2b.

When the aircraft 2 penetrates in the windshear 1, (instant t1), the component WX which it receives head-on, begins by increasing (part K1 of curve (K)), then, from a certain penetration inside said windshear corresponding to a point 6 (instant t2), decreases, although remaining head-on (part K2 of curve (K)). When the aircraft 2 attains the vicinity of the center C of the windshear 1 (instant t3), the amplitude of the component WX is cancelled. Then, the aircraft moving from this center C towards the outside of the windshear 1, the component WX which has changed sign to become a tail wind, takes an increasing negative amplitude (part K3 of the curve (K)). From a certain approach of the periphery of the windshear 1 corresponding to a point 7 (instant t4), the negative amplitude of the component WX, which still behaves as a tail wind, decreases (part K4 of curve (K)), until it becomes zero outside the windshear 1 (instant t5).

The passage of the aircraft 2 through the windshear 1 may thus be divided into three zones (cf. FIG. 2b), namely:

a zone (I), corresponding to part K1 of curve (K), in which the head wind increases, which generates a carrier effect;

a zone (II), corresponding to parts K2 and K3 of curve (K), in which the head wind decreases, then becomes an increasing tail wind, which, in both cases, generates a spoiler effect; and a zone (III), corresponding to part K4 of the curve (K), in which the tail wind decreases, which generates a carrier effect.

If, similarly to what has been schematically done hereinabove for the horizontal component WX of speed W, the schematic development of the vertical component WZ of this speed along the path 3 of the aircraft 2 in the windshear 1 is plotted, curve (N) of FIG. 2c is obtained. This curve (N) is composed of two end parts N1 and N2, corresponding respectively to the increase and to the decrease in the negative amplitude of WZ on the periphery of the windshear, and of an intermediate part L3 which corresponds to the major part of the passage through the windshear and in which the negative amplitude of WZ is substantially constant.

The curve part N1, i.e. the increase in the negative amplitude of the component WZ, begins at an instant t6, delayed with respect to instant t1. Similarly, the curve part N2, i.e the decrease in the negative amplitude of component WZ, terminates at an instant t9, prior to instant t5. t7 and t8 respectively designate the instants at which parts N1 and N3, and parts N3 and N2, join.

For reasons of simplification and schematization, parts K1 to K4 of curve (K) and parts N1 to N3 of curve (N) have, in FIGS. 2b and 2c, been shown in the form of segments of straight line.

Figure 3A:
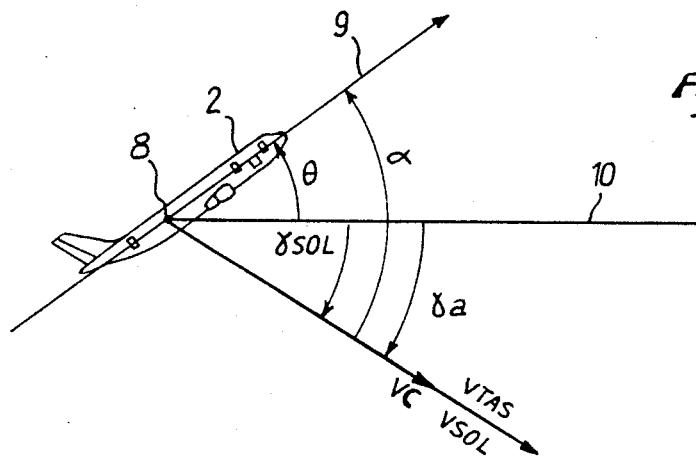
FIGS. 3a, 3b and 3c show the charts of the speeds concerning an aircraft before and during passage through windshear.

FIG. 3a shows the chart of the speeds applied at the center of gravity 8 of the aircraft 2 before it encounters the windshear 1. In this FIG. 3a, the longitudinal axis 9 of the aircraft 2 is inclined by the attitude $\theta$ with respect to the horizon line 10 (parallel to axis OX) and presents the angle of incidence $\alpha$ with respect to the aerodynamic speed VTAS which, itself, is inclined by the aerodynamic gradient $\gamma$ a with respect to the horizon line 10. In that case, the speed VSOL of the aircraft 2 with respect to ground G is merged with the aerodynamic speed VTAS. In FIG. 3a, as well as FIGS. 3b and 3c, the aerodynamic speed VC has also been shown, whose direction is obviously merged with that of the aerodynamic speed VTAS, but whose amplitude is corrected by the dynamic pressure. Hereinafter, the speed VC will be designated by "corrected aerodynamic speed".

When the aircraft 2 receives a vertical wind and a horizontal wind, for example because it lies within the windshear 1, these vertical and horizontal winds, or components WX and WY, intervene and must be composed with VTAS and VSOL.

If the configuration of the aircraft 2 cannot be modified, the attitude $\theta$ remains constant, whilst the speed VSOL and its gradient $\gamma$SOL with respect to the horizon line 10 are unchanged. This results in that the aerodynamic angle of incidence $\alpha$ and the aerodynamic gradient $\gamma$ a vary and that the aerodynamic speed VTAS varies differently from VSOL.

Figure 3B:
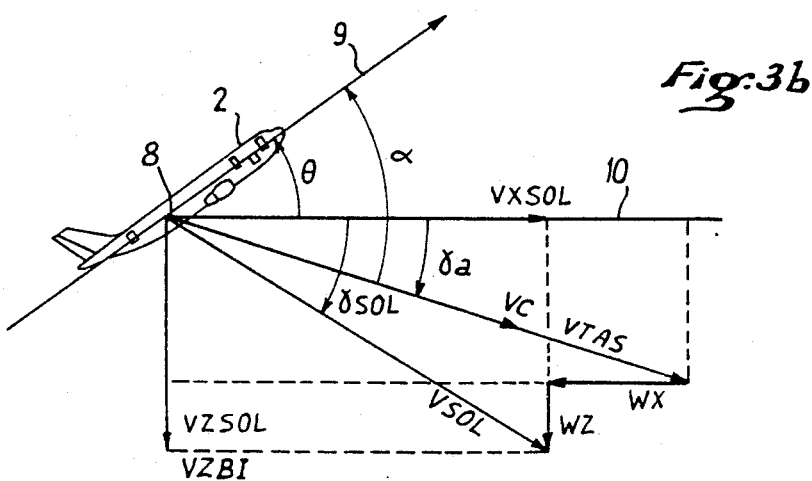

If, as shown in FIG. 3b, the component WX behaves as a head wind, the aerodynamic angle of incidence $\alpha$ becomes less than in the case of FIG. 3a. This FIG. 3b moreover shows that, if WX increases in amplitude, the aerodynamic angle of incidence $\alpha$ decreases, and vice versa.

Consequently, in zone (I) of FIG. 2b, when WX develops along the increasing part K1 of curve (K) with a positive derivative dWX/dt, this results in a negative variation $\Delta\alpha$ of the angle of incidence $\alpha$(carrier effect). On the other hand, in zone (II) of FIG. 2b, when WX follows the decreasing curve part K2 with a negative derivative dWX/dt, a positive variation $\Delta\alpha$ of the angle of incidence $\alpha$ (spoiler effect) follows.

Figure 3C:
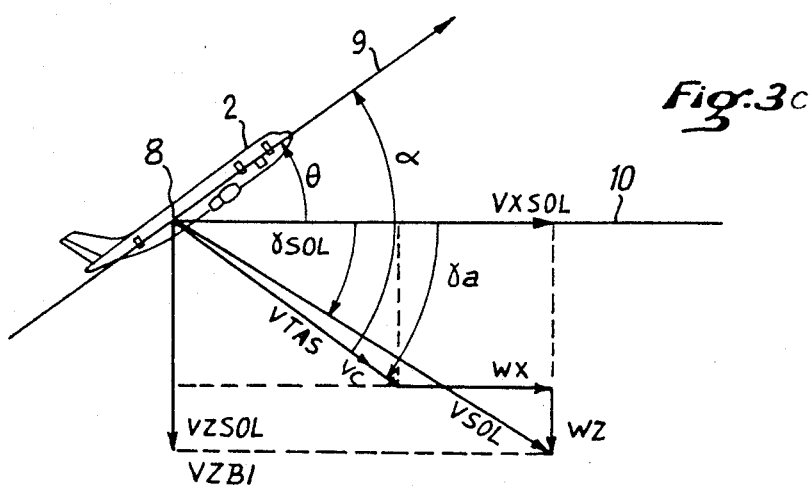

Similarly to the foregoing, if the speeds VSOL, WX, WZ and VTAS in the event of WX behaving as a tail wind (of. FIG. 3c) are composed, it is observed that, if WX increases in amplitude, the aerodynamic angle of incidence $\alpha$ increases, and vice versa.

Consequently, in zone (II) of FIG. 2b, when WX follows the decreasing curve part K3 with a negative derivative dWX/dt, this results in a positive variation $\Delta\alpha$ of the angle of incidence $\alpha$ (spoiler effect). On the other hand, when WX follows the increasing part K4 of curve (K), the derivative dWX/dt is positive and the variation $\Delta\alpha$ of the angle of incidence $\alpha$ is negative (carrier effect).

In this way, in any case, it is observed that, when dWX/dt is positive, $\Delta\alpha$ is negative, and vice versa.

From the foregoing, and particularly from a comparison of FIGS. 3a, 3b and 3c, it follows that the encounter of the aircraft 2 with a windshear 1 firstly brings about a reduction in the aerodynamic angle of incidence $\alpha$ of said aircraft, followed by a considerable increase in said angle of incidence.

Moreover, these FIGS. 3a to 3c show that WX is equal to the difference between the projections on the horizontal axis (or horizon line 10) of the aerodynamic speed VTAS and of the speed VSOL with respect to the ground and that, similarly, WZ is equal to the difference between the projections on the vertical axis OZ of the speed VSOL and of the aerodynamic speed VTAS. VXSOL and VZSOL respectively designate the projections of VSOL on axis OX and on axis OZ. It will be noted that the vertical component VZSOL corresponds to the baro-inertial speed VSBI.

It obviously follows from the foregoing comments and diagrams that, beyond a certain amplitude, the spoiler tail wind WX and/or the downward vertical wind WZ may saturate the aerodynamic performances of the aircraft 1, to the point of causing the aircraft to lose speed or altitude.

Figure 4:
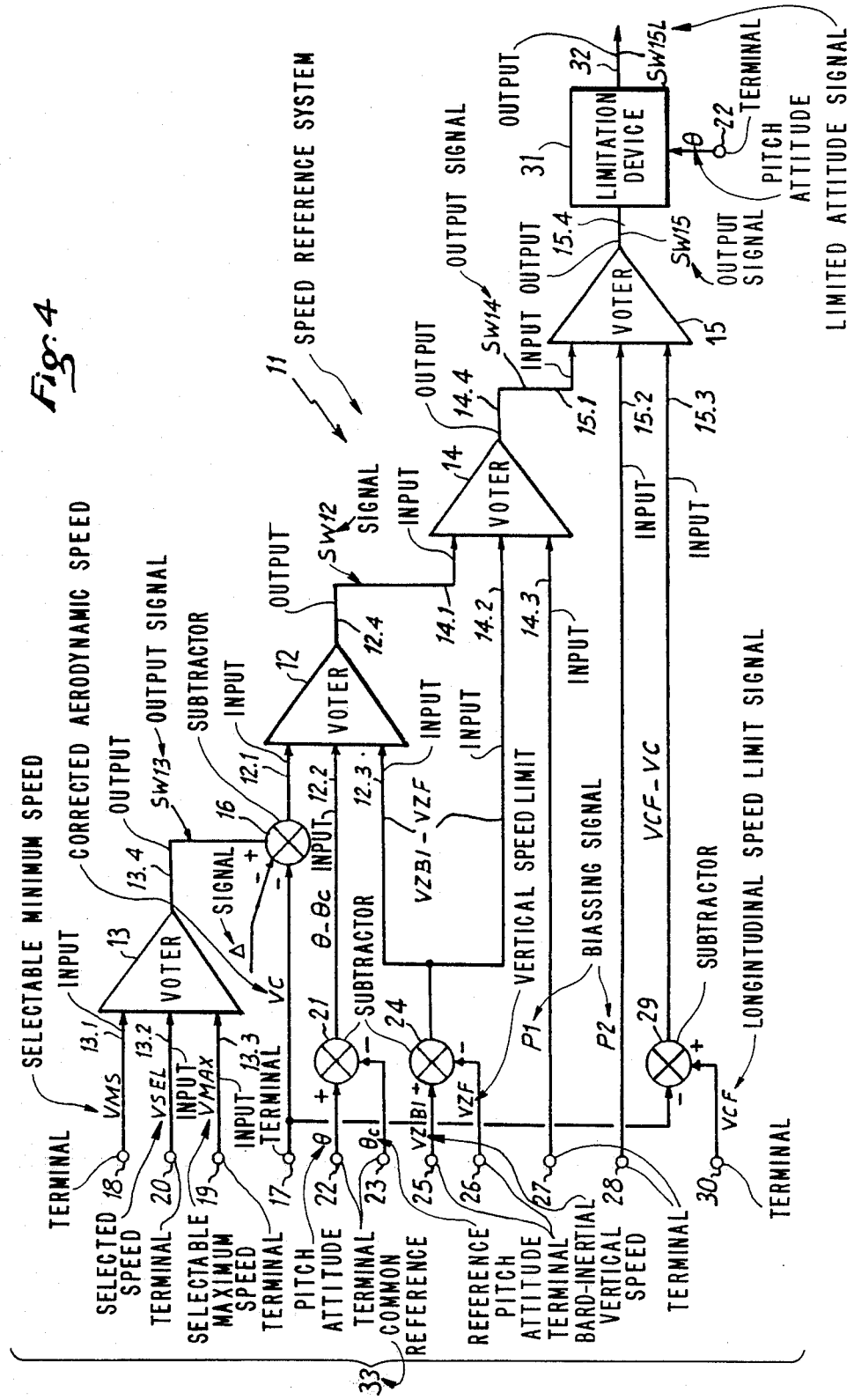
FIG. 4 gives the block diagram of an embodiment of the speed reference system according to the present invention.

The speed reference system 11 according to the invention, of which the simplified block diagram is given in FIG. 4, has for its object to define a strategy of survival making it possible to pass through such a windshear 1, even a very violent one, as best possible.

This system comprises four voters, respectively bearing references 12, 13, 14 and 15, the three inputs and the output of these voters respectively bearing the reference of the corresponding voter, associated respectively with the FIGS. 1, 2, 3 or 4.

The input 12.1 of voter 12 is connected to the output of a subtractor 16, of which a negative input receives from a terminal 17 an electric signal delivered by the on-board anemometric system (not shown) and representative of the corrected aerodynamic speed VC. Another negative input of the subtractor 16 receives a signal $\Delta$ which is representative of a speed equal to 10 kts if the aircraft is in normal condition and which is equal to 0 if one of the engines has failed. The positive input of the subtractor 16 is connected to the output 13.4 of the voter 13, on the three inputs 13.1, 13.2 and 13.3. of which appear electric signals, respectively representative of a selectable minimum speed VMS (equal for example to 1.3 VS for landing and 1.2 VS for take-off, VS being the speed of take-off of the aircraft 2), of a selected speed VSEL and of a selectable maximum speed VMAX, function of the lift augmenting of the aircraft.

The signals representative of the selectable minimum speed VMS and of the selectable maximum speed VMAX come from the on-board computer and are delivered on respective terminals 18 and 19, respectively connected to said inputs 13.1 and 13.3 of the voter 13. The signal representative of the selected speed VSEL is delivered by a selection member (not shown) at the disposal of the pilot of the aircraft and applied to a terminal 20, connected to the input 13.2 of voter 13.

The purpose of voter 13 is to eliminate any error of display or of speed display transmission. In fact, if the speed VSEL displayed by the pilot is included between VMS and VMAX, it will constitute the output signal SW13, appearing at the output 13.4 of the voter 13. On the other hand, if by error the speed VSEL displayed by the pilot is less than VMS or greater than VMAX, the signal SW13 represents VMS or VMAX respectively.

Furthermore, the control of the engines of aircraft 2 is such that the climb gradient with a broken-down engine is greater than 2.4%, which guarantees that the real corrected aerodynamic speed VC thereof is always greater (for example by 10 kts) than the speed VSEL displayed by the pilot. This results in that, for normal flight conditions, the difference SW13-VC is always negative.

The input 12.2 of the voter 12 is connected to the output of a subtractor 21, whose positive input receives from a terminal 22 an electric signal delivered by the on-board inertial unit (not shown) and representative of the pitch attitude $\theta$ of the aircraft 2. The negative input of the subtractor 21 is connected to a terminal 23, on which is applied, by a source (not shown), an electric signal representative of a reference pitch attitude $\theta c$, for example equal to 18°.

The input 12.3 of the voter 12 is connected to the output of a subtractor 24, whose positive input is connected to a terminal 25, on which is applied an electric signal delivered by the on-board inertial unit (not shown) and representative of the baro-inertial vertical speed VZBI. The negative input of the subtractor 24 is connected to a terminal 26, on which is applied, by a source (not shown), an electric signal representative of a vertical speed limit VZF, corresponding for example to a climb of the twin-engine aircraft 2, with only one engine, at a gradient of 2.4%.

Thus, at its inputs 12.1, 12.2 and 12.3, the voter 12 respectively receives the signals SW13-VC, $\theta - \theta c$ and VZBI-VZF, with the result that, depending on the respective values of said signals, the signal SW12 appearing on the output 12.4 of said voter 12 is formed, at each instant, by that of these three signals whose amplitude is included between those of the other two. As will be seen hereinafter, the voter 12 allows the control to adapt automatically to the performances of aircraft 2.

The three inputs 14.1, 14.2 and 14.3 of the voter 14 are respectively connected to the output 12.4 of the voter 12, to the output of the subtractor 24 and to a terminal 27, on which is applied, by a source (not shown), a biassing signal P1. In this way, said inputs 14.1, 14.2 and 14.3 respectively receive the output signal SW12 of voter 12, the signal VZBI-VZF and the biassing signal P1. This biassing signal P1 is chosen to be very small (for example negative) so that the output signal SW14 appearing at the output 14.4 of the voter 14 is constituted by that of the two signals SW12 and VZBI-VZF which is the smaller.

The three inputs 15.1, 15.2 and 15.3 of voter 15 are respectively connected to the output 14.4 of voter 14, to a terminal 28 on which is applied, by a source (not shown), a biassing signal P2 and to the output of a subtractor 29. The positive input of the subtractor 29 is connected to a terminal 30 on which is applied, by a source (not shown), a longitudinal speed limit signal VCF. This signal VCF is for example chosen to be equal to 1.1 VS, VS being the stalling speed of the aircraft 2. Furthermore, the negative input of the subtractor 29 is connected to the terminal 17, on which appears the corrected aerodynamic speed signal VC. In this way, the three inputs 15.1, 15.2 and 15.3 of the voter 15 respectively receive the output signal SW14 of voter 15, the biassing signal P2 and the signal VCF-VC. The biassing signal PS is chosen to be very large so that the output signal SW15 appearing at the output 15.4 of the voter 15 is constituted by that of the two signals SW14 and VCF-VC which is the greater.

Moreover, the output 15.4 of voter 15 is connected to the input of a limitation device 31, which will be described in greater detail hereinafter.

The output of the speed reference system 11 is formed by the output 32 of the limitation device 31.

Figure 5:
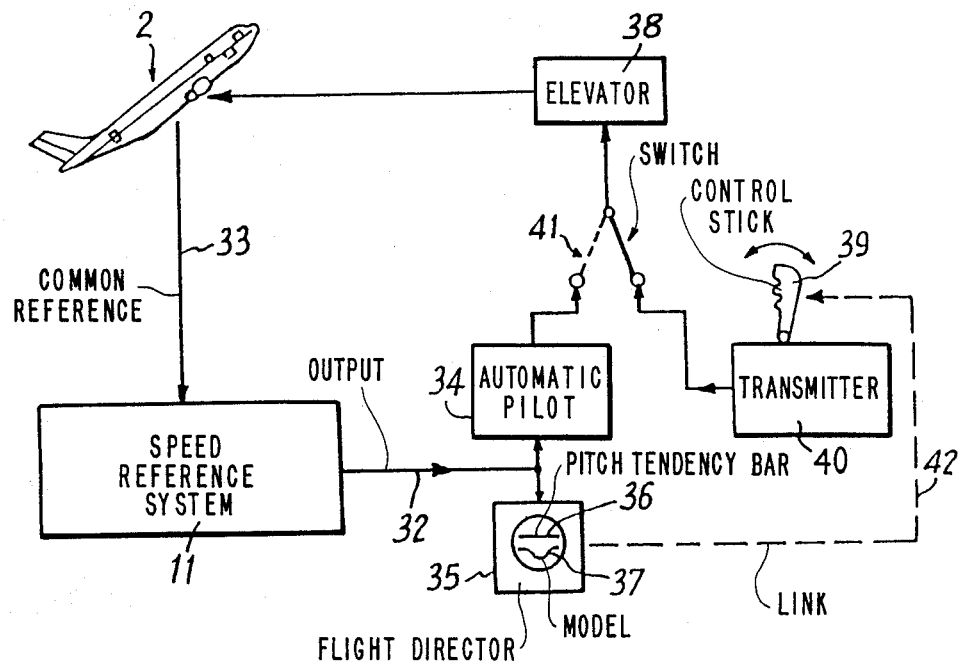
FIG. 5 is the block diagram of a piloting system comprising the speed reference system according to the present invention.

FIG. 5 schematically shows a piloting system including the speed reference system 11 according to the invention. Of course, although, in order to render the drawings clearer, this piloting system has been shown outside the aircraft, it goes without saying that it is located on board said aircraft.

In this FIG. 5, common reference 33 designates the different links between the speed reference system 11 and the other on-board apparatus (inertial unit, display devices, anemometric system, etc . . . ) addressing signals on the terminals 17-20, 22, 23, 25-28 and 30. The output 32 of the device 11 is connected, in common, to the automatic pilot 34 and to the flight director 35. This latter comprises, in known manner, a pitch tendency bar 36 and a model 37. The aircraft 2 is controlled in pitch by the elevator 38, which may be actuated either by the automatic pilot 34 or by the control stick 39 associated with a transmitter 40. A switch 41 allows the choice between the automatic pilot 34 and by the stick 39/transmitter 40 assembly. The control stick 39 is at the disposal of the pilot who watches the flight director 35. In this way, the link 42 between the flight director 35 and the control stick 39 is effected by the pilot of the aircraft.

The operation of the speed reference system 11 of FIG. 4 and of the piloting system of FIG. 5 will be described hereinafter, in several different situations, disregarding the action of the limitation device 31.

I—The aircraft 2 does not encounter a windshear and its thrust/mass ratio is high This situation corresponds to normal flight conditions, for which there are no aerodynamic disturbances, whilst the mass of the aircraft 2 is low or normal and the engines are capable of furnishing the maximum thrust.

Consequently, in that case, as mentioned hereinabove, the corrected aerodynamic speed VC is higher than the speed signal SW13, with the result that SW13-VC is negative. Moreover, the vertical baroinertial speed VZBI is greater than the vertical speed limit VZF, with the result that VZBI-VZF is positive. Similarly, the corrected aerodynamic speed VC is greater than the longitudinal speed limit VCF, with the result that VCF-VC is negative.

The aircraft 2 may then be controlled so that its attitude $\theta$ is maintained at the reference value $\theta c$, for example equal to 18°. The difference $\theta - \theta c$ is therefore small and included between SW13-VC (negative) and VZBI-VZF (positive).

Signal SW12 is then formed by signal $\theta - \theta c$.

In voter 14, the small signal SW12 = $\theta - \theta c$ is again compared with the positive signal VZBI-VZF and, as the biassing signal P1 is chosen to be negative (cf. hereinabove), it is again signal $\theta - \theta c$ which is transmitted by the voter 14. The signal SW14 is therefore also equal to $\theta - \theta c$.

In voter 15, the small signal SW14 = $\theta - \theta c$ is compared with the negative signal VCF-VC and with the very large biassing signal P2, with the result that it is that one which is transmitted by said voter. The signal SW15 is therefore equal to $\theta-\theta c$.

Under these conditions, it is seen that signal $\theta-\theta c$ appearing at the output of voter 12 is transmitted without alteration by the voters 14 and 15.

It is therefore signal SW15=$\theta-\theta c$ which appears on the output 32 and which is applied to the automatic pilot 34 and to the attitude director indicator 35. In the latter, the deviation separating the pitch tendency bar 36 from the model 37 is therefore representative of $\theta-\theta c$.

If switch 41 is in the position shown in solid lines in FIG. 5, the pilot acts on the elevator 38 via a control stick 39 in order to superpose the pitch tendency bar 36 with respect to the model 37. Consequently, the real attitude $\theta$ of the aircraft will take the reference value $\theta c$.

If switch 41 is in the position shown in broken lines in FIG. 5, the automatic pilot 34 will act directly on the elevator 38 in order to obtain a similar result.

It is therefore seen that, for normal flight conditions, the systems of FIGS. 4 and 5 make it possible to servo-control the attitude $\theta$ of the aircraft 2 by the reference value $\theta c = 18°$.

II—Aircraft 2 does not encounter windshear, but its thrust/mass ratio is low

This situation corresponds to flight conditions for which there are no aerodynamic disturbances, whereas either the mass of the aircraft is normal, with an engine failure, or the operation of the engines is normal, with a high mass.

In that case, the engines could no longer ensure a corrected aerodynamic speed VC greater than the speed signal SW13, if the attitude 8 were maintained at the reference value $\theta c$; consequently, $\theta-\theta c$ becomes negative, SW13 - VC becomes weak. On the other hand, VZBI-VZF and VCF-VC remain positive.

This results in that the signal SW12 at the output of voter 12 is constituted by the signal SW13-VC.

Similarly, since voter 14 allows passage of the smallest signal which is presented at its inputs 14.1 and 14.2, signal SW14 is equal to SW13-VC.

Moreover, since voter 15 allows passage of the largest signal which is presented at its inputs 15.1 and 15.3, signal SW15 is formed by the signal SW14 and is therefore equal to SW13-VC.

There again, it is seen that signal SW13-VC appearing at the output of voter 12 is transmitted without alteration by voters 14 and 15.

Under these conditions, the signal SW15 appearing at the output 32 is equal to SW13-VC, with the result that the deviation between the pitch tendency bar 36 and the model 37 is representative of the difference between the displayed speed SW13 and the corrected aerodynamic speed VC. In fact, when the automatic pilot 34 or the pilot of the aircraft will have acted to bring the pitch bar 36 into register with the model 37, he/it will have modified the attitude 8 of said aircraft by a value $\Delta\theta$ such that, at the moment of register, the corrected aerodynamic speed VC will be equal to the displayed value SW13. In other words, the assembly 34-41-38 and the assembly 35-42-39-40-41-38 convert any signal appearing on the output 32 into an equivalent of attitude signal, which it tends to cancel. Consequently, similarly to what has been described hereinabove, the corrected aerodynamic speed of the aircraft 2 is servo-controlled, by modification of the attitude of the aircraft 2, by this displayed speed, by actuation either of the automatic pilot 34, or of the attitude director indicator 35 and the control stick 39, as a function of the position of the switch 41.

Under such conditions, VZBI-VZF may possibly become transitorily very weak, and even weaker than SW13-VC, with the result that it is then signal VZBI-VZF which would form the signal SW15. Piloting of the aircraft 2 would then be such that its vertical speed would be servo-controlled by the vertical speed limit.

III—Aircraft 2 is subjected to the action of windshear WX saturating the performances of the aircraft (a) Firstly, the attitude $\theta$ can no longer be maintained at the reference value $\theta c$ and decreases, with the result that $\theta-\theta c$ becomes negative. Moreover, the speed VC also decreases, whilst remaining greater than SW13, i.e. SW13-VC approaches zero, whilst remaining positive. Finally, VZBI-VZF remains positive.

The signal SW12 at the output of voter 12 is therefore signal SW13-VC. It will be readily ascertained, with the aid of the above explanations, that signals SW14 and SW15 are also constituted by signal SW13-VC.

Consequently, the elevator 38 is actuated (by the automatic pilot 34 or by the pilot following the indications of the attitude director indicator 35) so that the aircraft 2 dives ($\theta$ decreases) in order to maintain its corrected aerodynamic speed VC at the displayed value SW13. Concomitantly, the value of VZBI decreases.

(b) The tail wind WX persisting, the value of VZBI approaches that of VZF, with the result that VZBI-VZF becomes close to zero, whilst $\theta-\theta c$ remains negative and SW13-VC remains positive.

The signal SW12 at the output of voter 12 is therefore signal VZVI-VZF. It will easily be verified that the signals SW14 and SW15 are also formed by VZBI-VZF.

In this way, the aircraft 2 is now controlled in order to maintain its vertical speed VZBI at the limiting value VZF. This results in an order to pull up (increase of $\theta$) and a decrease of VC, which becomes less than VCF.

(c) In the hypothesis of the tail wind still persisting, it is no longer possible to maintain VZBI=VZF and VZBI-VZF passes through zero. The same applies to $\theta-\theta c$, despite the increase mentioned under b). Finally, SW13-VC remains positive. Consequently, the signals SW12 and SW14 remain formed by VZBI-VZF. However, the voter 15 which then compares the weak signal VZBI-VZF (which even becomes negative) with the weak positive signal VCF-VC and with the large biasing signal P2, votes signal VCF-VC.

Consequently, the aircraft 2 is piloted so that VC is maintained at the limiting value VCF, VZBI being negative and $\theta$ decreasing.

IV—Aircraft 2 is subjected to the action of a windshear WZ saturating the performances of the aircraft (a) Whatever the initial situation (maintenance $\theta = 18°$ or VC=VSEL+10 kts) of voter 12, the appearance of a windshear saturating the performance of the aircraft will cause the latter to descend, i.e. VZBI is less than VZF. In this way, the controls of voter 12 and of voter 14 impose a control issuing from signal VZBI-VZF.

Aircraft 2 is therefore piloted by the system of FIG. 5, so that VZBI is servo-controlled by VZF. This results in an increase of attitude $\theta$.

(b) The windshear WZ persisting and $\theta$ increasing beyond 18°, the maintenance of the aircraft at constant altitude is translated by an exchange between the kinetic energy and the potential energy, with the result that VC decreases.

Thus, VSEL-VC is positive (track 12.1), $\theta-\theta c$ is positive (track 12.2) and VZBI-VZF is equal to 0 (track 12.3). Voter 12 then privileges track 12.1 or track 12.2 and naturally demands to dive. Voter 14 will then impose its own demand VZBI-VZF =0 and will maintain the minimum vertical speed VZF.

If the disturbance WZ persists, the speed VC continues to decrease and attains the limiting speed VCF; voter 15 will then surpass voters 14 and 12 to impose that aircraft 2 be controlled so that its corrected aerodynamic speed VF is maintained at the limiting value VCF by reduction of the attitude $\theta$.

Of course, the instantaneous real flight conditions are combinations of the simple cases given hereinabove by way of example, in order to illustrate the operation of the systems of FIGS. 4 and 5.

In the presence of a considerable windshear, the attitude $\theta$ may take a high value to pull up in order to maintain the vertical speed VZBI at the limiting value VZF. However, at that moment, the angle of incidence $\alpha$ of the aircraft 2 may have a value close to the value of the angle of incidence at which the stick shaker intervenes. In order to avoid any risk of accident in the case of sudden disappearance of the windshear WZ, the purpose of device 31 is to limit the controlled attitude SW15 as a function of the real attitude $\theta$ of the aircraft 2 to a value less than the angle of stall. To that end, the device 31 receives, in addition to signal SW15, the information of real attitude $\theta$ available on terminal 22 and delivers on output 32 a limited attitude signal SW15L, which is addressed to the automatic pilot 34 and to the attitude director indicator 35.

Figure 6:
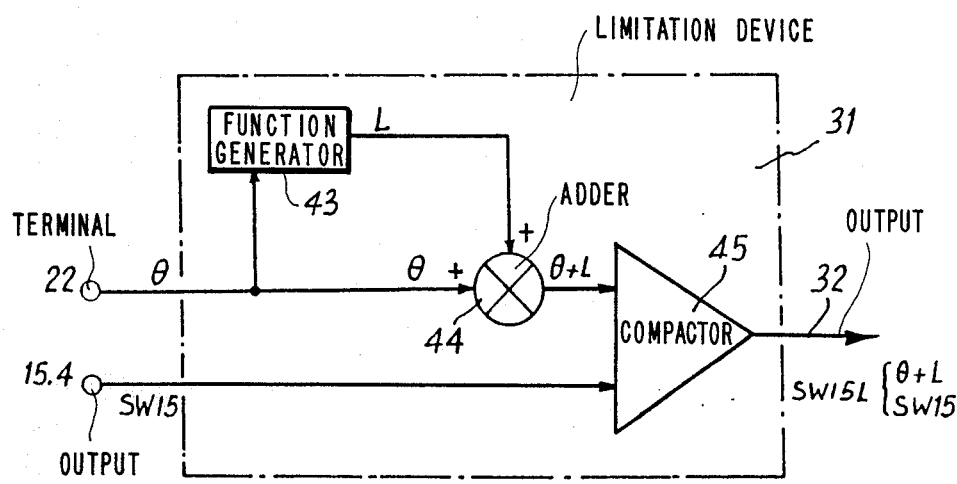
FIG. 6 shows the block diagram of an attitude limitation device, avoiding the aircraft stalling at the end of the windshear.

FIG. 6 shows, in the form of a block diagram, an embodiment of the limitation device 31, which comprises a function generator 43, for example a memory containing a table of values, which causes a value of a limiting function L to correspond to any value of the real attitude $\theta$, as well as an adder 44 and a comparator 45. The adder 44 forms the sum $\theta+L$ of the value $\theta$ and of the corresponding limiting value L, whilst comparator 45 compares the sum $\theta+L$ and the signal SW15. This comparator 45 addresses on output 32 an attitude control signal SW15L which is either the signal $\theta+L$, if SW15 is greater than $\theta+L$, or signal SW15, if $\theta+L$ is greater than SW15. It is seen that the comparator 45 may be constituted by a voter, such as those bearing references 12 to 15, receiving a biassing signal (such as biassing signal P1) allowing the smaller of signals SW15 or $\theta+L$ to pass.

Figure 7:
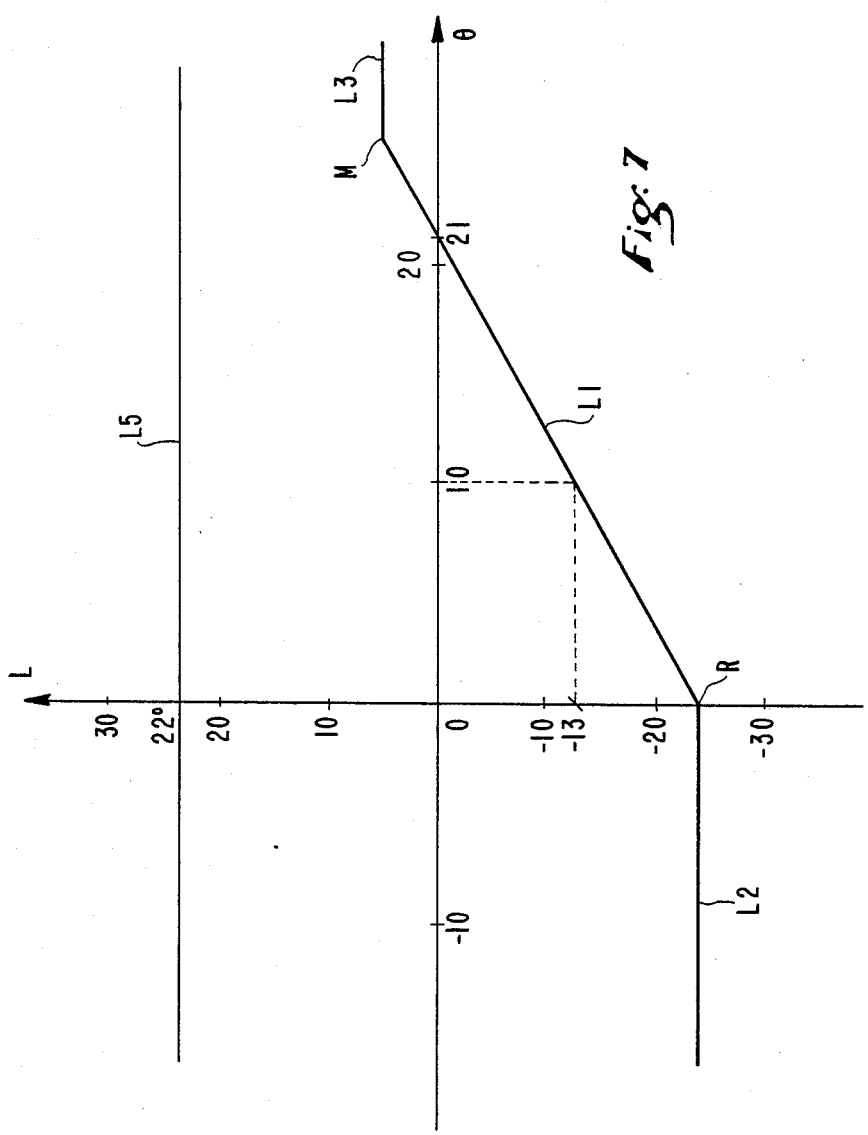
FIG. 7 is a chart illustrating the operation of the limitation device of FIG. 6.

FIG. 7 shows, as a function of the real attitude $\theta$ (in degrees), an example of the variation of function L (likewise in degrees). In this Figure, the values of L corresponding respectively to pulling up and to diving, are respectively borne on the negative and positive parts of the Y-axis. The function L represented in FIG. 7 comprises, towards the attitudes to pull up, an inclined rectilinear portion L1, connected at each of its ends to a rectilinear portion L2 or L3, parallel to the X-axis. For example, portion L1 intersects the X-axis for a value of $\theta$ equal to 21° and is joined to portions L2 and L3, respectively, at points R and M. Point R has for example for coordinates $\theta=0$ and $L=-24$; similarly, point M has for example for coordinates $\theta=26$ and $L=+6$.

Thus, for example, if aircraft 2 presents an attitude to pull up $\theta=+10°$, the order to pull up authorized by the generator 43 is equal to $\theta c=\theta-(-13°)$, with the result that the controlled maximum attitude will be at the most 23° with $\theta=10°$. If the signal SW15 appearing at the output 15.4 of voter 15 has an amplitude less than $-13°$, the order SW15L will be equal to $-13°$. On the other hand, if signal SW15 has an amplitude greater than $-13°$, it will be transmitted by the limitation device 31 and SW15L will be constituted by SW15. Similarly, it is seen that, if $\theta=+15°$, the order of demanded attitude to pull up cannot exceed 22°.

If the attitude of the aircraft to pull up is equal to 21°, this value cannot be exceeded, i.e. any additional demand to pull up of signal SW15 will not be taken into account. Moreover, if the attitude to pull up is, in absolute value, greater than 21°, the aircraft will be controlled to dive.

What is claimed is:

1. A speed reference system for the piloting of an aircraft, said system comprising:

a first voter (12) receiving at its inputs electrical signals respectively representative of a first difference between a desired speed selected by the pilot (VSEL) and the real aerodynamic speed (VC) of the aircraft, of a second difference ($\theta-\theta c$) between the real pitch attitude ($\theta$) of said aircraft and a reference pitch attitude ($\theta c$), and of a third difference (VZBI-VZF) between the real baro-inertial vertical speed (VZBI) of said aircraft and a vertical speed lower limit (VZF);

a second voter (14) receiving at its inputs the output signal (SW12) of said first voter (12) and the signal (VZBI-VZF) representative of said third difference and delivering at its output that of its two input signals which is the smaller; and a third voter (15) receiving at its inputs the output signal (SW14) of said second voter (14) and the signal representative of a fourth difference (VCF-VC) between an aerodynamic speed lower limit (VCF) and said real aerodynamic speed (VC), said third voter delivering at its output that of its two input signals which is the greater, the output signal from said third voter being used to control the instantaneous speed of said aircraft relative to the instantaneous stall speed of the said aircraft.

2. The speed reference system of claim 1 wherein said second voter (14) is identical to said first voter (12), two of the inputs of said second voter (14) respectively receiving the output signal (SW12) of said first voter and said third difference (VZBI-VZF), while on its third input is applied a first biasing signal (P1) whose amplitude and sign are selected so that it is smaller than the smallest value likely to be taken by said output signal (SW12) of the first voter and by said third difference.

3. The speed reference system of claim 1 wherein said third voter (15) is identical to said first voter (12), two of the inputs of said third voter (15) receiving respectively the output signal (SW14) of said second voter (14) and said fourth difference (VCF-VC), while on its third input is applied a second biasing signal (P2) whose amplitude and sign are selected so that it is larger than the largest value likely to be taken by the output signal of said second voter and by said fourth difference.

4. The speed reference system of claim 1 further comprising means (31) for limiting the increase of real pitch attitude, connected to the output of said third voter (15).

5. The speed reference system of claim 4 wherein the greater is the real pitch attitude of the aircraft, the smaller is the limitation of the increase of real pitch attitude.

6. The speed reference value of claim 4 wherein, beyond a first high threshold of real pitch attitude of the aircraft to pull up, said limitation means (31) delivers an order to dive, in order to effect a piloting of the maximum pitch attitude.

7. The speed reference system of claim 6 wherein, between said first high threshold and a second high threshold of real pitch attitude to pull up, greater in absolute value than said first threshold, the order to dive is a function of said attitude, while beyond said second high threshold, the order to dive is independent of the value of said real pitch attitude to pull up.

8. The speed reference system of claim 4 wherein, beyond a low threshold of real pitch attitude of the aircraft to pull up, said limitation means (31) delivers an order to pull up independent of the value of said attitude.

9. The speed reference system of claim 4 wherein said limitation means limit, in addition, the value of the real pitch attitude to dive.

10. The speed reference system of claim 1 comprising a fourth voter (13) receiving at its inputs respectively a signal (VSEL) representative of said desired speed selected by the pilot and signals representative respectively of a maximum reference value (VMAX) and of a minimum reference value (VMS) for said selected speed, the output of said fourth voter being connected to a subtractor (16) receiving a signal representative of said real aerodynamic speed (VC), the output of said subtractor being connected to the input of said first voter (12) receiving said first difference.

11. A system for piloting an aircraft in pitch during the phases of take-off and go-around, comprising a speed reference system as set forth in claim 1 of which the output is connected to a flight control computer, in order to control the elevator of said aircraft in accordance with the signal delivered by said speed reference system.

* * * * *